United States Patent [19]

Ozeki

[11] Patent Number: 4,858,355
[45] Date of Patent: Aug. 22, 1989

[54] METHOD AND APPARATUS FOR SIMULTANEOUSLY INSERTING LAMINAR MATERIALS INTO A FILE SHEET

[75] Inventor: Jiro Ozeki, Tokyo, Japan

[73] Assignee: Slidex Corporation, Japan

[21] Appl. No.: 50,187

[22] Filed: May 14, 1987

[30] Foreign Application Priority Data

Jul. 31, 1986 [JP]  Japan ............................ 61-181148

[51] Int. Cl.⁴ ............................................ G02B 27/02
[52] U.S. Cl. ...................................... 40/366; 206/456
[58] Field of Search ................. 40/361, 362, 366, 367, 40/158 B; 206/456; 353/120, 122

[56] References Cited

U.S. PATENT DOCUMENTS

| | | | |
|---|---|---|---|
| 3,217,436 | 11/1965 | Van Wormer, Jr. | 40/367 |
| 3,419,984 | 1/1969 | Sakamoto | 40/367 |
| 4,202,122 | 5/1980 | Namiki | 40/158 B |

Primary Examiner—Carlton R. Croyle
Assistant Examiner—Leonard P. Walnoha
Attorney, Agent, or Firm—Welsh & Katz, Ltd.

[57] ABSTRACT

An apparatus for simultaneously inserting a plurality of slides into a file sheet and a method for using such apparatus is disclosed. The apparatus comprises a series of pockets which align with a series of compartments in a slide structure. Pawl members in the compartments engage with the slides to retain the slides in the pockets. The slide structure moves reciprocally longitudinally, as well as vertically in the plane of the mounting plate.

3 Claims, 3 Drawing Sheets

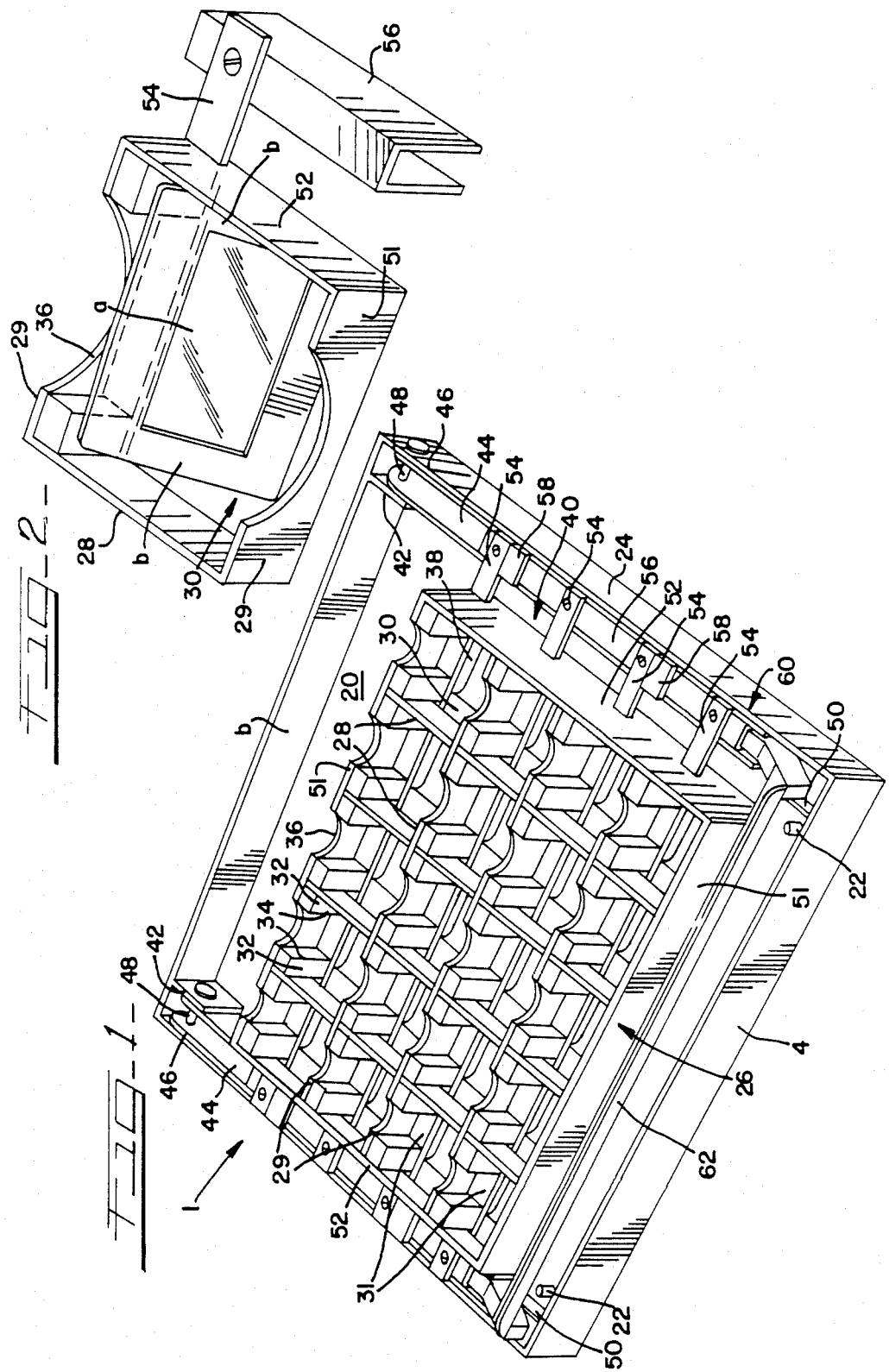

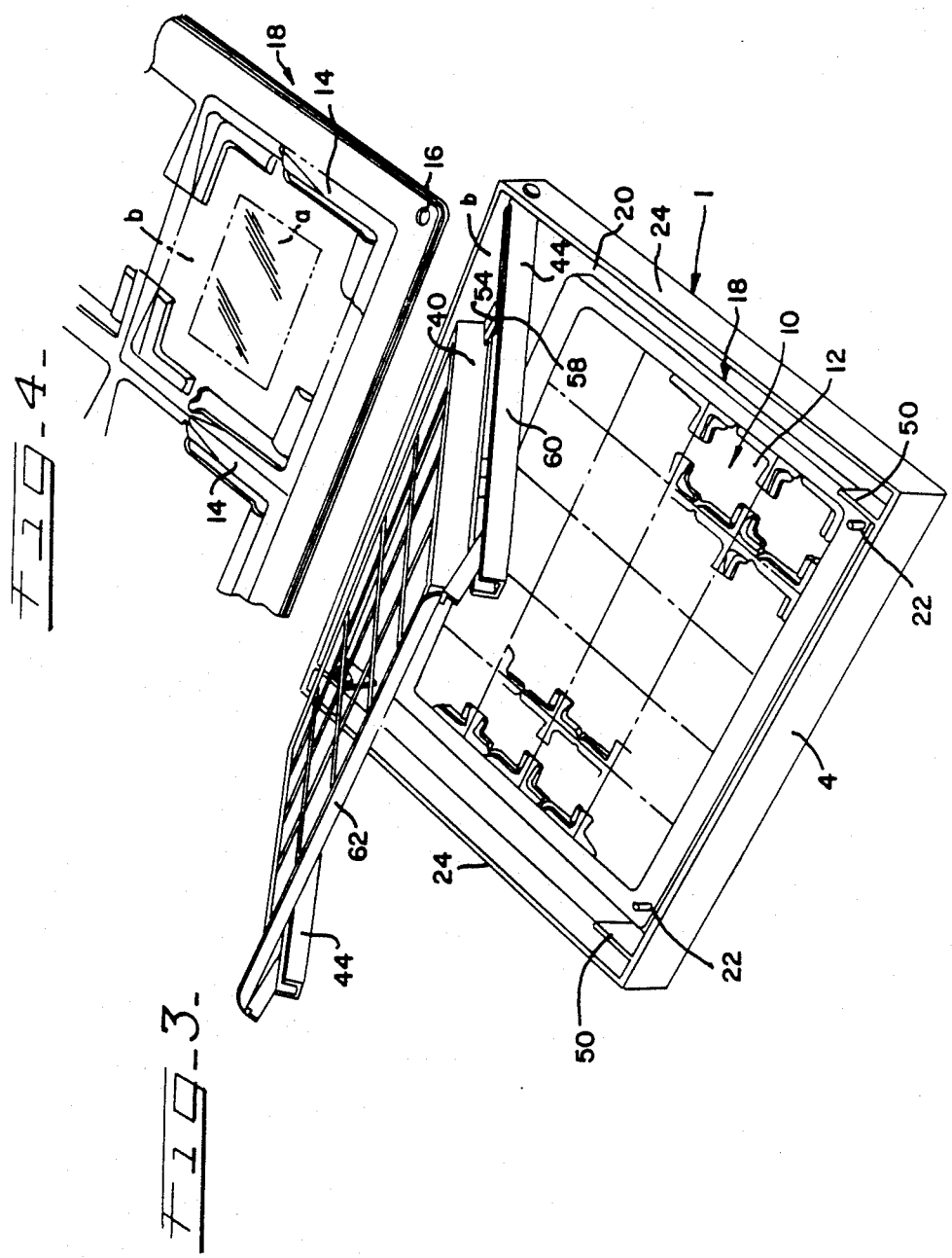

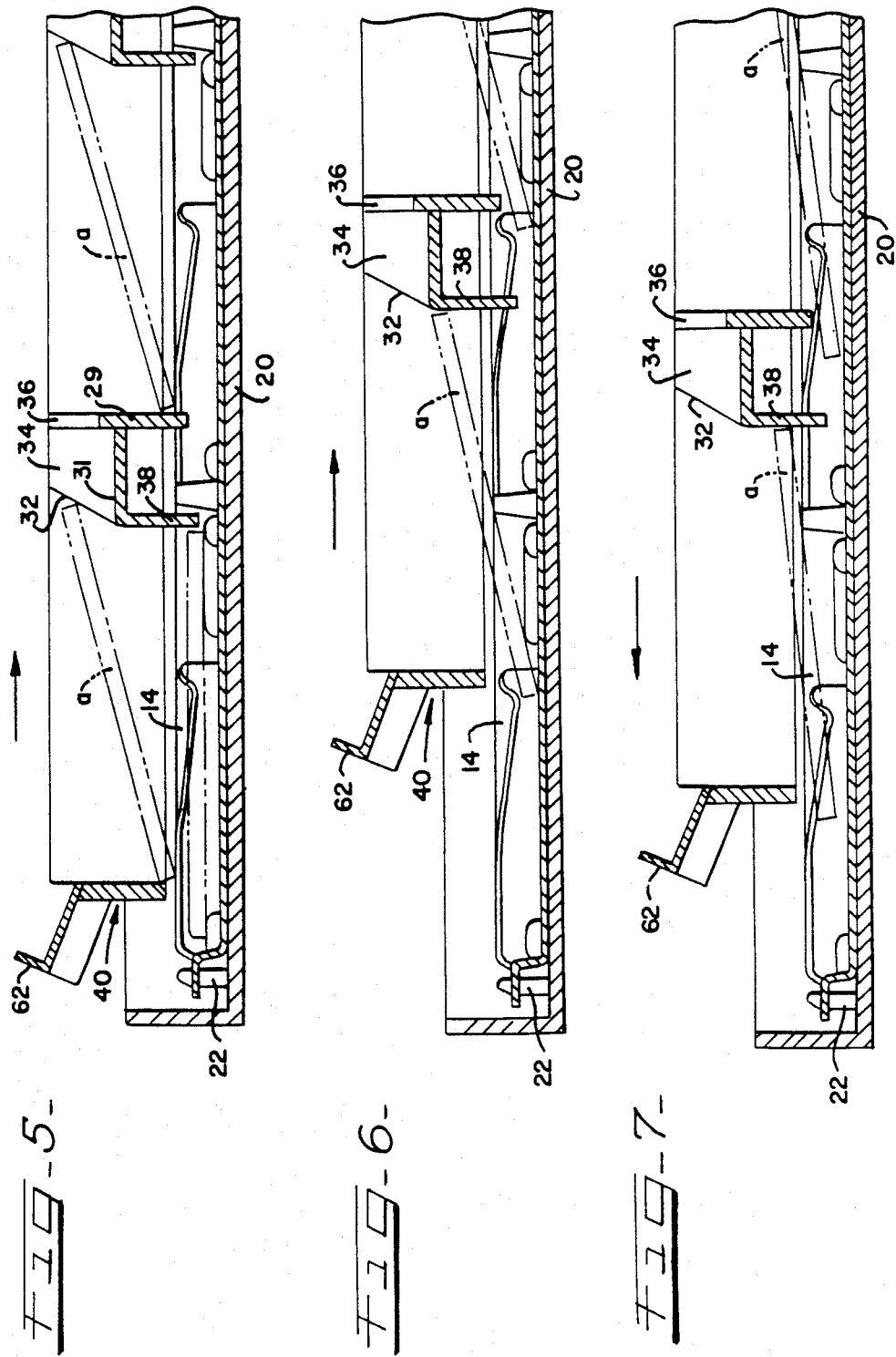

METHOD AND APPARATUS FOR SIMULTANEOUSLY INSERTING LAMINAR MATERIALS INTO A FILE SHEET

TECHNICAL FIELD

This invention relates to a method and apparatus for simultaneously inserting a number of laminar materials such as mounted slide films, slides, coins and the like into a file sheet which is adapted to hold such laminar materials.

BACKGROUND ART

A file sheet 18 has heretofore been proposed comprising a transparent or translucent, light-transmissible and diffusible rectangular plastic sheet having a plurality of rectangular pockets 10 defined by longitudinally and transversely extending spaced ribs intersecting with each other, each pocket 10 being provided with a retaining tab 14 projecting inwardly from each longitudinal rib which forms a side wall of the pocket.

A number of laminar materials (a) such as mounted slide films, as mounted slides therefor may be held and stored in an ordered or aligned array in the file sheet 18 by manually forcing the laminar materials (a) successively one by one between and beneath the opposed retaining tabs 14 of the respective pockets 10 from the front ends of the tabs toward the interior of the pockets until the materials are fitted and held in the respective pockets with the opposed grasp portions (b) of the materials held down against the bottom panel 12 of the file sheet by the retaining tabs 14.

However, the operation of storing and holding a number of laminar materials (a) in an ordered array in a file sheet 18 by manually inserting the materials successively one by one into the respective pockets 10 requires much trouble and time involved with inspecting the contents of photos one by one in the case of slide films and inserting them successively into the file sheet pockets. Moreover, if a user puts slide films in the pockets in a wrong order, he (or she) must remove successively all the laminar materials (a) but those placed in a correct order of array from the wrong pockets and place them in correct pockets. In addition, if laminar materials are held in the pockets with an improper attitude as upside down, or with the face downward, or with the lateral side extending transversely of the file sheet, the user must take the trouble to remove the laminar materials and orient and reinsert them correctly into the pockets.

Accordingly, it is a primary object of this invention to provide a method and apparatus for inserting laminar materials such as mounted slide films, slides, and the like which is easy to handle and may eliminate the aforesaid inconvenience and trouble with the prior art by enabling simultaneous insertion of a number of laminar materials into pockets of a file sheet adapted to hold and store the materials in an ordered array.

DISCLOSURE OF THE INVENTION

In order to accomplish the aforesaid objects, the present invention provides a method of simultaneously inserting a number of laminar materials (a) such as mounted slide films, slides, and the like into a file sheet (18), said file sheet comprising a base sheet (12) having a plurality of rectangular recessed pockets (10) aligned both in rows and in columns, each of said pockets having a pair of retaining tabs (14) on its opposed sides for retaining opposite side grasp portions (b) of one of the laminar materials against the base sheet (12) in each pocket (10), said method comprising the steps of:

placing the laminar materials (a) successively in the respective pockets (10) of said file sheet (18) with the front ends of the grasp portions (b) of the laminar materials positioned at the rearwardly open inlets of the grasping gaps between said opposite side retaining tabs (14) in the respective pockets (10) and the base sheet (12), and forcing all the laminar materials (a) simultaneously forwardly beneath said retaining tabs (14) through said inlets into said gaps to be retained by said tabs against the base sheet.

The present invention also provides an apparatus for simultaneously inserting a number of laminar materials such as mounted slide films, slides, and the like into a file sheet, comprising:

a file sheet (18) comprising a base sheet (12) having a plurality of rectangular recessed pockets (10) aligned both in rows and in columns, each of said pockets having a pair of retaining tabs (14) on its opposed sides for retaining opposite side grasp portions (b) of one of the laminar materials against the base sheet (12) in each pocket (10);

a file sheet mounting plate (20) for removably securing said file sheet (18) in place thereon;

a slide structure (40) having a plurality of both longitudinally and transversely aligned compartments (30) which are, when positioned in parallel with the plane of said mounting plate (20), in alignment with the corresponding pockets (10) of the file sheet (18), and having depending pawl members (38) provided in the lower portions of the respective compartments (30), said pawl members being engageable with the rear ends of the opposite sides grasp portions (b) of the corresponding laminar materials (a) to force the laminar materials into the respective pockets (10) beneath the retaining tabs;

slide means (60) for reciprocally moving said slide structure longitudinally through a predetermined stroke; and means for moving the slide structure vertically away from the plane of said mounting plate.

If desired, said mounting plate may be made of a light-transmissible and light diffusing material, so that light from a suitable light source (not shown) disposed under the translucent mounting plate may be transmitted through the mounting plate to illuminate the mounted slide films.

BRIEF DESCRIPTION OF THE DRAWINGS

These and other objects and features of the invention are more fully disclosed in the following specification, reference being had to the accompanying drawings, in which:

FIG. 1 is a perspective view of the apparatus according to one embodiment of this invention;

FIG. 2 is an enlarged perspective view of the principal part of the apparatus shown in FIG. 1;

FIG. 3 is a perspective view of the apparatus shown in FIG. 1 illustrating the slide structure being in its open position with the file sheet fixed to the mounting plate;

FIG. 4 is an enlarged perspective view of a portion of the file sheet;

FIG. 5 is a cross-sectional view of the apparatus taken vertically and longitudinally thereof illustrating the slide structure in its initial position;

FIG. 6 is a cross-sectional view similar to FIG. 5 but illustrating the slide structure having begun to insert the mounted slide films into the file sheet;

FIG. 7 is a cross-sectional view similar to FIGS. 5 and 6 but illustrating the slide structure being in the course of forcing the mounted slide films into the file sheet.

DETAILED DESCRIPTION OF THE EMBODIMENT

While the invention is described herein as applied to mounted slide films (a), it should be understood that this invention is applicable to any laminar material.

A conventional file sheet 18 as shown in FIGS. 3 and 4 comprises a base sheet or bottom sheet 12 having a plurality of rectangular recessed pockets 10 aligned both in rows and in columns, said pockets being defined by an outer peripheral frame member and ribs longitudinally and transversely extending across the base sheet 12 and intersecting each other. Each pocket 10 is provided with retaining tabs 14 extending along the opposed side ribs for retaining opposite side grasp portions (b) of the mount of a mounted slide film (a) against the base sheet 12. The peripheral frame member has a pair of locating holes 16 formed therethrough adjacent its front opposed corners for the purpose as will become apparent hereinafter.

The apparatus according to the invention comprises a rectangular box-like outer case 1 composed of a front wall 4, a rear wall 6, opposed side walls 24 connecting the front and rear walls, and a bottom wall 20.

The bottom wall 20 of the case 1 has a pair of spaced locating pegs 22 upstanding therefrom. A file sheet 18 may be fixed in position on the bottom wall 20 by passing the pegs 20 through the holes 16 of the file sheet. The bottom wall 20 thus serves as a mounting plate for the file sheet 18.

Disposed within the outer case 1 is a rectangular inner framing 26 comprising a front frame member 51, a rear frame member 51' and opposed side frame members 52, 52. The inner framing 26 is provided with a number of rectangular compartments 30 positioned in vertical alignment with the respective rectangular pockets 10 of the file sheet 18 so as to permit insertion of mounted slide films (a) into the pockets. The compartments 30 are defined by the peripheral frame members 51, 51', and 52 and longitudinally extending parallel partition panels 28 and transversely extending parallel partition panels 29 intersecting with the longitudinal panels. The bottom ends of the frame members 51, 51', 52 and partition panels 28, 29 which form the inner framing are all spaced above from the bottom wall or file sheet mounting plate 20 of the case 1 so as to define a space between the bottom of the inner framing and the mounting plate 20 to accommodate a file sheet 18, as seen in FIGS. 5 to 7.

The size or extent of the inner framing 26 in its horizontal plane is smaller than that of the mounting plate 20.

A horizontal ledge 31 (FIGS. 1 and 5) is disposed extending transversely along each of the transverse partition panel 29 and across the rear and lower areas of the compartments 30.

A pair of upright rectangular posts 34 extend upwardly from the ledge 31 within opposed rear corners of each compartment 30. Each post 34 has a ramp surface 32 facing toward the front for the purpose as will become apparent hereinbelow.

Each transverse partition panel 29 is formed in its upper edge with notches 36, one for each of the compartments 30 so as to permit easy insertion and removal of mounted slide films (a).

A pawl member 38 depends vertically downwardly from each of the horizontal ledges 31 adjacent its forward edge. The pawl member 38 should have a sufficient rigidity to force slide films (a) forwardly into the file sheet pockets 10 beneath the retaining tabs 14 as well as to engage with and retain in place the front edges of the slide films (a) inserted in the pockets 10 positioned immediately behind the pawl member. Although not illustrated in the drawings, the pawl member 38 may be somewhat yieldable to flex rearwardly when the slide film is completely inserted into the pocket to thereby prevent the mount of the film from being damaged by continuing forward movement of the pawl member. Alternatively, the pawl member may be vertically self-adjustable so as to accommodate different thicknesses of the mount of the slide film.

A pair of bearing lugs 42 (FIG. 1) extend forwardly from the rear wall 6 of the outer case adjacent its opposite ends. A pair of channel-shaped rail members 44 extend longitudinally along and adjacent the respective side walls 24 of the outer case and are held at their rear ends 46 between the corresponding bearing lugs 42 and the facing side walls 24 and mounted for vertical pivotal movement by pivot shafts 48 passed through the side walls 6, rail members 44 and bearing lugs 42. The front wall 4 of the case has a pair of retainer lugs 50 extending rearwardly therefrom in longitudinal alignment with the respective bearing lugs 42 to hold the forward ends of the rail members 44.

A plurality of longitudinally spaced support arms 54 extend laterally outwardly from each of the side frame members 52 of the inner framing 26. A channel-shaped slide member 56 is secured at its web portion to and depends from the undersurface of each of the support arms 54. The slide members 56 are slidably received in the rail members 44 for longitudinal sliding movements therealong. A plurality of stop members 58 are positioned with longitudinal predetermined intervals and fixed to the upper edges of the rail members 44 to limit the longitudinal reciprocal movements of the support arms 54 and hence the inner framing 26 along the rail members as well as to prevent withdrawal of the slide members 56 from the rail members.

The inner framing 26 and the support arms 54 with slide members 56 constitute a slide structure 40, and the support arms 54 with slide members 56 and the rail members 44 constitute slide means 60 to permit the slide structure 40 to be moved from the initial position, in which mounted slide films (a) may be inserted in the compartments 30, to the forward position to force the slide films into the file sheet pockets 10 in a manner as will be described hereinbelow.

A generally U-shaped handle 62 is provided for pivoting the slide structure 40 in unison with the rail members 44 about the pivot shafts 48 between the closed position, proximate to the mounting plate 20 and the file sheet 18 placed on the plate, and the open position away from the mounting plate 20. More specifically, the U-shaped handle 62 has a pair of opposed leg portions longitudinally slidably received in the respective rail members 44 and fixed to the slide members 56 so that the handle 62 may be used not only to swing the slide structure 40 between its closed and open positions but also to move the slide structure to and fro along the rail members 44. The bight portion of the handle is spaced from and extends parallel to the front frame member 51 of the inner framing 26.

If desired, the file sheet mounting plate 20 may be formed of a light-transmissible and diffusable material and a light source for illumination (not shown) may be built in under the mounting plate 20.

In operation, the user grasps the handle 62 to lift the slide structure 40 upward to the open position as shown in FIG. 3 and then inserts an empty file sheet 18 onto the base plate or mounting plate 20 of the outer case 1 with the locating holes 16 fitted over the locating pegs 22. Once the file sheet 18 is thus fixed in place on the mounting plate 20, the slide structure 40 is moved down to its closed position proximate to and parallel to the mounting plate 20 and the file sheet 18 as shown in FIG. 1, and then moved rearwardly along the rail members 44 to its initial position as shown in FIG. 5. In this position a number of laminar data materials (a) such as mounted slide films or slides are placed one by one in the respective compartments 30 with the rear edges of the laminar materials bearing against the ramp surfaces 32 of the posts 34 in the respective compartments 30 while the front edges of the laminar materials rest on the retaining tabs 14.

If the laminar data materials (a) are mounted slide films and the apparatus is of a light box type in which the mounting plate 20 is made of a light-transmissible and diffusable material and an illumination means is disposed under the mounting plate, the slide films may be illuminated from beneath so that the user can view the contents of the slide films, whereby he can readily inspect the proper order of array of slide films as well as the alignment or attitude of slide films with respect to the compartments. If there is any irregularity with respect to the order of array and/or attitude of slide films, the user can make the necessary correction.

Then, as the user moves the slide structure 40 from the initial intermediate position shown in FIG. 5 further rearwardly to the predetermined rearward position shown in FIG. 6, all the laminar materials (a) are simultaneously moved rearwardly as the lower forward ends of the grasp portions (b) of the laminar materials (a) slide over the upper surfaces of the retaining tabs 14 of the file sheet pockets 10 and drop off the rear ends of the retaining tabs onto the file sheet at the open ends of the grasping gaps between the file sheet and the retaining tabs while the rear ends of the laminar materials slide down the ramp surfaces 32 of the posts 34 into abutting engagement with the front surfaces of the respective pawl members 38 so that the laminar materials assume a position approximately parallel to the plane of the file sheet, as shown in FIG. 6.

The user then moves the slide structure forwardly toward the initial position as shown in FIG. 7. During this movement, the pawl members 38 in abutment with the rear ends of the laminar materials (a) force all the laminar materials simultaneously forwardly into the grasping gaps beneath the respective retaining tabs until the laminar materials are held between the retaining tabs 14 and the upper surface of the file sheet 18 in the respective pockets 10 all at once.

Upon completion of the operation of forcing the laminar materials into the file sheet pockets, the user may grasp the handle 62 to swing the slide structure 40 upwardly away from the mounting plate 20 and file sheet 18 and remove the file sheet 18 having now the laminar materials fitted in its pockets 10 from the mounting plate 20.

It is to be appreciated that the present invention provides a very simple and convenient method and apparatus for simultaneously inserting a number of laminar materials such as mounted slide films, slides, coins and the like into a file sheet which is adapted to hold such laminar materials. Any desired number of laminar materials within the range of the capacity of the file sheet for holding laminar materials may be placed into the pockets in the file sheet all at once by simply sliding the slide structure to and fro only once.

While the invention is described herein with reference to the preferred embodiment, the above description is not meant to limit the scope of the invention. From this description, many variations will be apparent to one skilled in the art that would yet be encompassed by the spirit and the scope of the invention as described in the following claims.

I claim:

1. A method of simultaneously inserting a plurality of laminar materials each having a rigid frame and opposite side grasp portions into a file sheet, said file sheet comprising a base sheet having a plurality of rectangular recessed pockets aligned both in rows and in columns, each of said pockets having a pair of retaining tabs on its opposed sides for retaining the opposite side grasp portions of one of the laminar materials against the base sheet in each pocket, said method comprising the steps of:

placing the laminar materials successively in the respective pockets of said file sheet with the front ends of the grasp portions of the laminar materials positioned at the rearwardly open inlets of the grasping gaps between said opposite side retaining tabs in the respective pockets and the base sheet, and forcing all the laminar materials simultaneously forwardly beneath said retaining tabs through said inlets into the gaps to be retained by said tabs against the base sheet.

2. An apparatus for simultaneously inserting a plurality of laminar materials having a rigid frame into a file sheet, comprising:

a file sheet comprising a base sheet having a plurality of rectangular recessed pockets aligned both in rows and in columns, each of said pockets having a pair of retaining tabs on its opposed sides for retaining opposite side grasp portions of one of the laminar materials against the base sheet in each pocket;

a file sheet mounting plate for removably securing said file sheet in place thereon;

a slide structure having a plurality of both longitudinally and transversely aligned compartments which are, when positioned in parallel with the plane of said mounting late, in alignment with the corresponding pockets of the file sheet, and having depending pawl members provided in the lower portions of the respective compartments, said pawl members being engageable with the rear ends of the opposite sides grasp portions of the corresponding laminar materials to force the laminar materials into the respective pockets beneath the retaining tabs;

slide means for reciprocally moving said slide structure longitudinally through a predetermined stroke; and means for moving the slide structure vertically relative to the plane of said mounting plate.

3. The apparatus according to claim 2, wherein said mounting plate is made of a light-transmissible and light-diffusing material.

* * * * *